(12) United States Patent
Maslov et al.

(10) Patent No.: US 6,844,645 B2
(45) Date of Patent: Jan. 18, 2005

(54) PERMANENT MAGNET MOTOR ROTOR HAVING MAGNETIC PERMEABLE MATERIAL FOR ENHANCED FLUX DISTRIBUTION

(75) Inventors: Boris A. Maslov, Reston, VA (US); Zareh Soghomonian, Sterling, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/290,506

(22) Filed: Nov. 8, 2002

(65) Prior Publication Data
US 2004/0090135 A1 May 13, 2004

(51) Int. Cl.[7] .............................................. H02K 21/12
(52) U.S. Cl. ........................ 310/156.12; 310/156.13; 310/156.28; 310/216; 310/218
(58) Field of Search ................ 310/156.08, 156.12, 310/156.13, 156.23, 156.26, 156.28, 156.29, 156.31, 154.08, 154.12, 216–218, 254, 258

(56) References Cited

U.S. PATENT DOCUMENTS

| | | | | |
|---|---|---|---|---|
| 4,774,428 A | * | 9/1988 | Konecny ..................... 310/198 |
| 4,786,834 A | * | 11/1988 | Grant et al. ................. 310/194 |
| 5,753,991 A | | 5/1998 | Couture et al. | |
| 6,097,125 A | * | 8/2000 | Park et al. ............. 310/156.45 |
| 6,191,516 B1 | * | 2/2001 | Froehlich et al. ....... 310/156.08 |

FOREIGN PATENT DOCUMENTS

| | | | |
|---|---|---|---|
| EP | 0 413 183 A1 | 7/1990 | |
| JP | 5-219669 | * 8/1993 | ............ 310/154.08 |
| WO | WO 00/45501 | 8/2000 | |

* cited by examiner

Primary Examiner—Tran Nguyen
(74) Attorney, Agent, or Firm—McDermott Will & Emery LLP (57) ABSTRACT

A permanent magnet motor has rotor structure that includes magnetically permeable backing material attached to magnets for enhancing flux density distribution. A plurality of permanent magnets are circumferentially distributed about an axis of rotation, adjacent magnets successively alternating in magnetic polarity. The magnetically permeable material is configured with apertures therethrough at areas of low flux density, such as at central portions of the magnets, while in contact with perimeter areas of the magnets. Additional apertures in the material may be located at spaced intersections at which no significant flux density exists. The apertures may be replaced with backing material portions of reduced radial thickness.

19 Claims, 10 Drawing Sheets

PERMANENT MAGNET MOTOR ROTOR HAVING MAGNETIC PERMEABLE MATERIAL FOR ENHANCED FLUX DISTRIBUTION

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, and copending U.S. application Ser. No. 09/966,101 of Maslov et al., filed Oct. 1, 2001, all commonly assigned with the present application. The disclosures of these applications are incorporated by reference herein.

FIELD OF THE INVENTION

The present invention relates to permanent magnet electric motors, more particularly to motors having a plurality of permanent magnet rotor elements integrated with magnetically permeable material configured to enhance flux density distribution while minimizing weight.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., number 09/826,423, identifies and addresses the need for an improved motor amenable to simplified manufacture and capable of efficient and flexible operating characteristics. In a vehicle drive environment, it is highly desirable to attain smooth operation over a wide speed range, while maintaining a high torque output capability at minimum power consumption. The copending related U.S. applications incorporate electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments.

The above-identified copending related U.S. patent application of Maslov et al., number 09/826,423, describes optimization of rotor parameters such as the grade of the magnets, the energy density and the overall magnetic characteristics of the magnet grade, the size and the dimensions of the magnets. Adjustment of such parameters effect the working permeance and the overall operating condition of the magnet when it is part of the rotor. Other factors are the temperature stability of the magnet, the finishing, coating and post processing steps taken in manufacturing of the magnets for the intended application, the stability of the magnetization over the curvilinear surface of the magnet, uniformity of the radial polarization of the magnet, the adjacent gap between two separate magnets, the mechanical features of the edges of the magnets, and the return flux path of the magnet as provided by a back iron ring section.

The Maslov et al. applications recognize that isolation of the electromagnet groups permits individual concentration of flux in the magnetic cores of the groups, with virtually no flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group.

Figure 1:
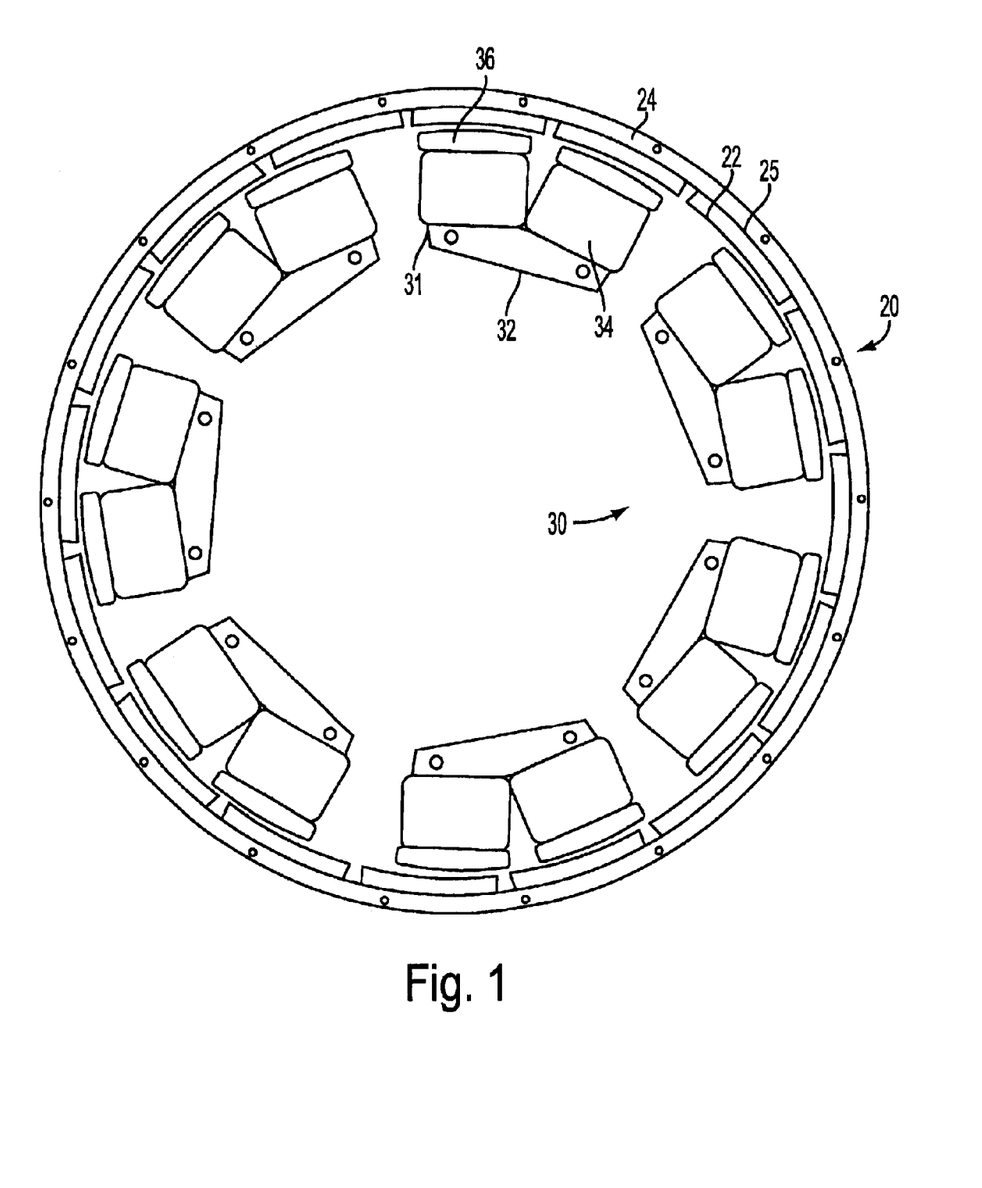
FIG. 1 is a plan view of a motor to which the present application is applicable.

FIG. 1 is a plan view of a motor such as disclosed in the above-identified 09/826,423 application. Reference is made to that application for a more detailed description. Rotor member 20 is an annular ring structure having a plurality of permanent magnets 22 substantially evenly distributed. The permanent magnets are divided into groups of north/south pole pairs, the permanent magnets of each group joined by magnetically permeable material 25 that serves as a magnetic return path between the adjacent permanent magnetic poles 22. The permanent magnet groups each form a magnetic circuit that is isolated from adjacent groups. Cylindrical back plate 24, of non-magnetically permeable material such as aluminum, joins the permanent magnet groups to form an annular ring. The permanent magnets alternate in magnetic polarity along the inner periphery of the annular ring. The rotor surrounds a stator member 30, the rotor and stator members being separated by a radial air gap. Stator 30 comprises groups of poles 31 of uniform construction that are evenly distributed along the air gap. Each stator group comprises a generally U-shaped magnetic structure 32 having two pole faces 36 at the air gap. Each stator group structure is separate, and magnetically isolated, from adjacent groups. The legs of the poles are wound with windings 34. The windings, when energized, are configured to provide opposite north/south polarities to the poles of each pole pair, thereby forming an electromagnet. Reversal of polarity of energization effects reversal of the magnetic polarities of the pole pair. Appropriate timed switching of stator winding energization along the radial air gap effects electromotive force generation through interaction of magnetic forces between the stator and rotor across the air gap. Stator groups 31 are secured to non magnetically permeable support structure, not shown herein, whereby the stator groups form an annular ring configuration. A relatively narrow radial stator dimension provides a favorable concentration of flux within each stator element structure focussed at the air gap. By virtue of this configuration, and the absence of stray transformer effects from adjacent stator pole groups, high torque output can be efficiently obtained.

Figure 2:
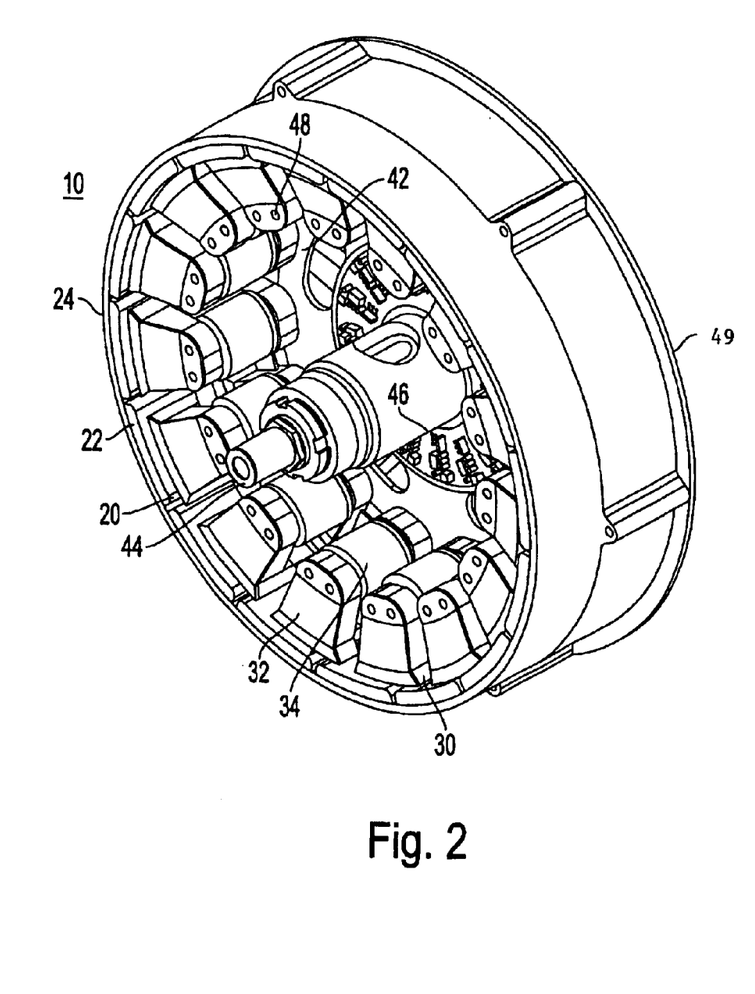
FIG. 2 is a cutaway view of another motor to which the present application is applicable.

The above-identified U.S. application Ser. No. 09/966,101 of Maslov et al. describes benefits to be gained from utilization of three dimensional aspects of motor structure. FIG. 2 is a cutaway view of a structure such as described in that application. Motor 10 comprises annular permanent magnet rotor 20 and annular stator structure 30 separated by a radial air gap. The stator comprises a plurality of ferromagnetically isolated elements. Core segments 32, made of magnetically permeable material and isolated from direct contact with each other, have respective windings 34 formed thereon. The rotor comprises a plurality of permanent magnets 22, circumferentially distributed about the air gap and affixed to a non-magnetic annular back plate 24, which may be formed of aluminum or other non magnetically permeable material. The flux distributions produced by the rotor magnets can be further enhanced by provision of a magnetically permeable element mounted to the back of the rotor magnets. The stationary shaft 44, plates 42 and stator structure, are contained within a housing 49, to which the annular rotor backplate and permanent magnets are attached. Reference is made to the application for a more detailed description.

Figure 3A:
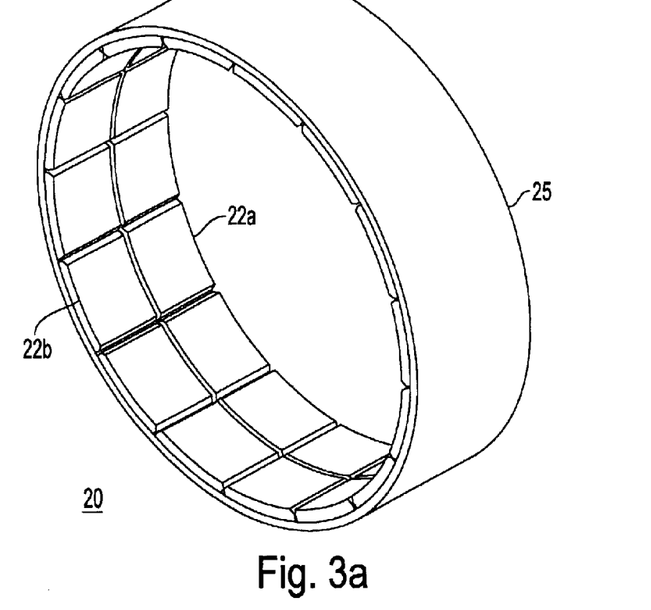
FIGS. 3a–3d are perspective views of rotor structures that may be incorporated in the motor shown in FIG. 2.
Figure 3B:
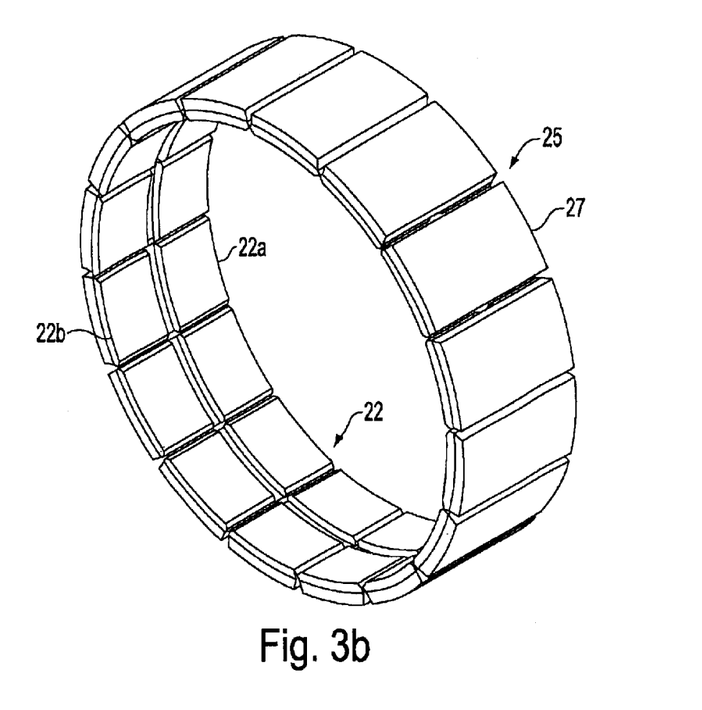
Figure 3C:
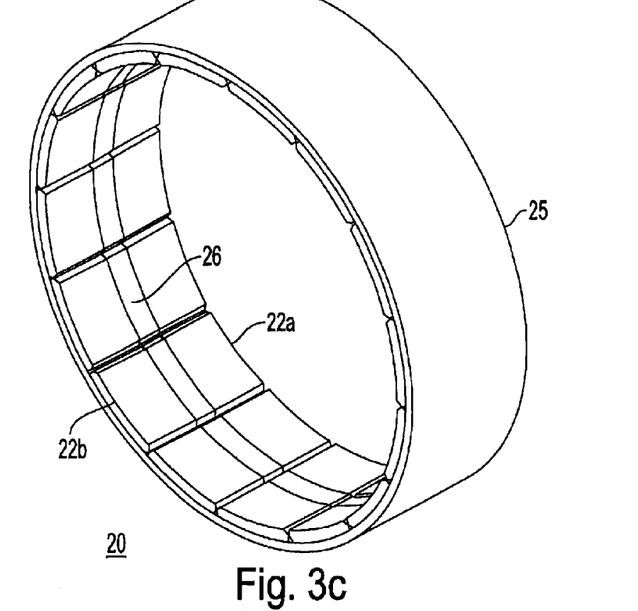
Figure 3D:
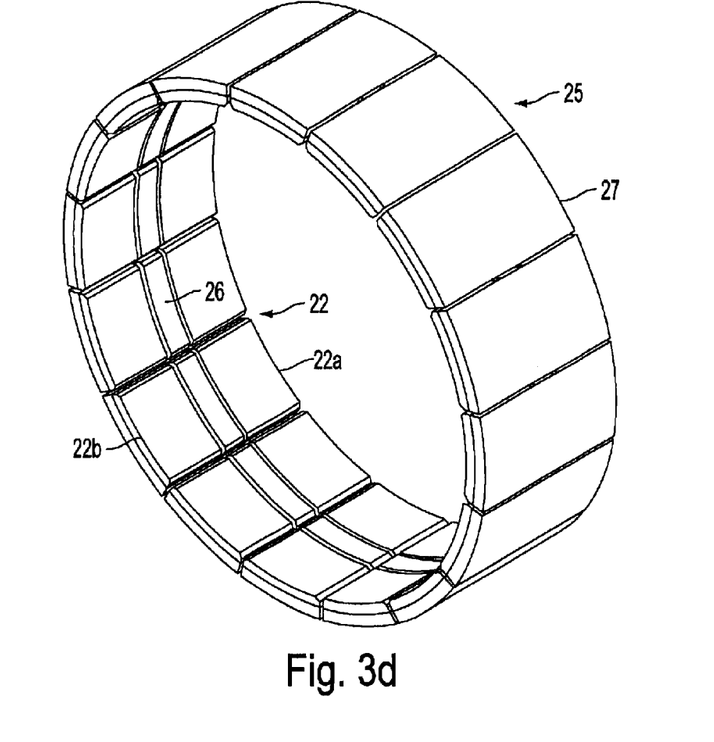

Also described therein is the further enhancement of flux distributions produced by the rotor magnets by provision of a magnetically permeable element mounted to the back of the rotor magnets, such as illustrated in FIGS. 3a–3d. FIG. 3a illustrates a continuous magnetic annular back plate 25 upon which are mounted the individual permanent magnets. Each axially adjacent pair of magnets 22a and 22b is a rotor permanent magnet pole pair that interacts with a stator core element pole pair to effect motor rotation. A significant increase in the effective flux density in the air gap is obtained without saturation of flux in the back iron. In the illustration of FIG. 3b, the magnetic annular back plate 25 is segmented into strips 27. Attached to each strip is an axially aligned permanent magnet pair. Spacing between the strips provides improved magnetic flux distribution for the respective individual permanent magnet pairs. Direct losses of stray flux and interference, or cross-talk, between adjoining units are minimized because each axial magnetic unit is structurally disjointed. In the rotor arrangement of FIG. 3c, axially magnetized permanent magnets 26 are located between the axially aligned rotor pair magnets 22a and 22b. North-south magnetization orientation of magnets 22a and 22b is in the radial direction. Magnets 22a and 22b are each in contact with one end of magnet 26 to form an individual rotor axial group. Magnet 26 is magnetized in the axial direction to aid concentration and closure of the flux between magnets 22a and 22b. As in FIG. 3a, magnetic annular back plate 25 is continuous. In the rotor arrangement of FIG. 3d, the magnetic annular back plate 25 is segmented. Each back plate strip 27, upon which a rotor axial group is mounted, is separated from an adjacent strip to improve flux distribution.

As described above, the use of a magnetically permeable backing material for the permanent magnets provides flux density distribution advantages, particularly with relatively flat bipole magnets having magnetic polarization in the radial direction that interact with a plurality of stator core elements that are separated ferromagnetically from each other. In the employment of motors for driving vehicles, however, available output power is limited by factors such as overall motor weight and heat development during operation. Magnetically permeable magnet backing material, typically of iron or the like, has significant weight and heat dissipation drawbacks for such motor environments. The need thus exists for motors having enhanced flux distribution capabilities for maximization of torque output capability, while minimizing assembly weight and providing satisfactory cooling.

DISCLOSURE OF THE INVENTION

The present invention furthers the above-described needs of the prior art and provides additional advantages for configurations such as the isolated individual stator core arrangements disclosed in the above identified Maslov et al. applications. The invention relates to permanent magnet rotors having magnetically permeable backing material that enhances flux density distribution and motors incorporating such rotor structures. Advantages of the present invention are achieved, at least in part, by adjusting the configuration of the permeable material in accordance with the magnetic fields created by interaction among adjacent permanent magnets.

A plurality of permanent magnets are circumferentially distributed about an axis of rotation, adjacent magnets successively alternating in magnetic polarity. The permanent magnets preferably are spaced from each other and arrayed in an annular ring having radially inner and outer circumferential surfaces, the magnetically permeable material being in contact with one of the circumferential annular ring surfaces. Each magnet exhibits one magnetic polarity at the inner surface and an opposite magnetic polarity at the outer surface to form a polar orientation in the radial direction. The magnetically permeable material, which is in contact with surfaces of the plurality of permanent magnets to enhance flux distribution among the magnets, is provided with apertures therethrough at areas of low flux density. As an alternative to apertures, the radial thickness of the permeable material may be decreased at low flux density areas. The thickness may be tapered in accordance with the flux density distribution pattern in the rotor.

In motors having ferromagnetically isolated stator cores with all poles in radial alignment, a single column of permanent magnets in radial alignment is distributed in the annular ring. The magnetically permeable material may be segmented along the circumferential direction, the apertures forming axially aligned spaces between segments, the spaces coinciding with central portions of the magnets. Preferably, the rotor coaxially surrounds the stator and the magnetically permeable material is in contact with the outer circumferential surface of the rotor ring.

In motors having ferromagnetically isolated stator cores with poles of each core in axial alignment, the permanent magnet annular ring comprises a plurality of axially separated sections. The magnets in each section are substantially equally spaced from each other in the circumferential direction and in substantially axial alignment with the magnets of the other sections. The magnet array thus includes at least one column space perpendicular to the axis and a plurality of row spaces aligned in the axial direction. The apertures in the magnetically permeable backing material comprise openings coincident with central portions of the magnets, the magnetically permeable material being in contact with perimeter regions of the magnets. Alternatively, the thickness of the material may be reduced at the central magnet portions. Additional apertures or reduced thickness in the material may be located at column space and row space intersections. In a variation, auxiliary magnets are positioned between magnets of adjacent sections, the auxiliary magnets having polar orientations in the axial direction. With such a magnet arrangement, the magnetically permeable material may be configured with apertures overlapping the auxiliary magnets, i.e., the column between axially separated sections.

The above described configurations provide the advantage of enhanced flux distribution, while significantly reducing the overall weight of the assembly. In addition, the spaces or depressions in the magnetically permeable material provide a means of air flow for heat dissipation and cooling of the motor.

A particular advantageous use of the motor is for driving a vehicle. As one example of such an arrangement, the stator is surrounded by the rotor and a wheel is mounted thereon. The generally annular magnetically permeable material is in contact with the outer circumferential surface of the rotor ring. The outer surface of the material may be configured as a cylinder of substantially uniform radial distance from the axis or, alternatively, the radial thickness of the material may be made variable.

A further advantage of the present invention is that the magnetically permeable material may be embedded in a non-magnetic back plate rotor casing, thereby permitting a larger diameter for the motor elements. With a larger air gap diameter, a greater torque capacity can be obtained.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which:

FIG. 6a is a plan view of a variation of the rotor of FIG. 5a.

DETAILED DESCRIPTION OF THE INVENTION

The motor of the present invention is suitable for use in driving a vehicle wheel of an automobile, motorcycle, bicycle, or the like. The drawing illustrations thus depict motor structure that can be housed within a vehicle wheel, the stator rigidly mounted to a stationary shaft and surrounded by a rotor for driving the wheel. It should be appreciated, however, that the vehicle context is merely exemplary of a multitude of particular applications in which the motor of the present invention may be employed.

Figure 4A:
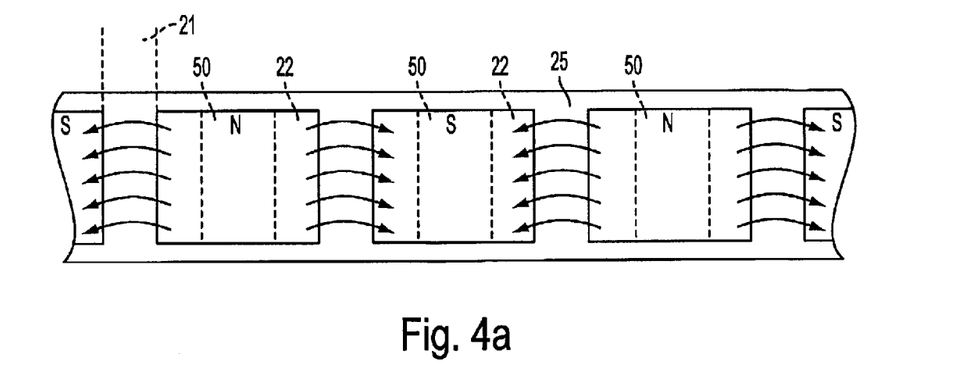
FIG. 4a is a plan view of a single rotor permanent magnet ring, such as may be employed in the motor of FIG. 1.

FIG. 4a is a plan view of a single rotor permanent magnet ring, such as may be employed in the motor of FIG. 1. The axis of rotation, not shown, about which the magnets are arranged is oriented in the vertical direction. Permanent magnets 22 of alternating north (N) and south (S) polarities are aligned in a circumferential direction on a magnetically permeable backing material 25 and separated from each other by axially aligned spaces 21. The material may be iron, low-carbon steel or other, solid or laminated, ferrous materials and attached to the magnets by conventional adhesive. Alternatively, the material may be sprayed as a ferrous liquid onto a backing rim. Lines of flux, created by the interactive attractive forces of magnetic fields between adjacent magnets of opposite magnetic polarities, are shown as conventionally emanating from the N poles and directed to the S poles. The magnetic material permits the lines of flux to be concentrated at the adjacent perimeter portions of the magnets serves as a bridging means through which relatively horizontal lines of flux are distributed in the spaces between magnets. The lines of flux have minimal or no impact on the permeable backing material at vertical bands 50 between dotted lines at the center portions of the magnets.

Figure 4B:
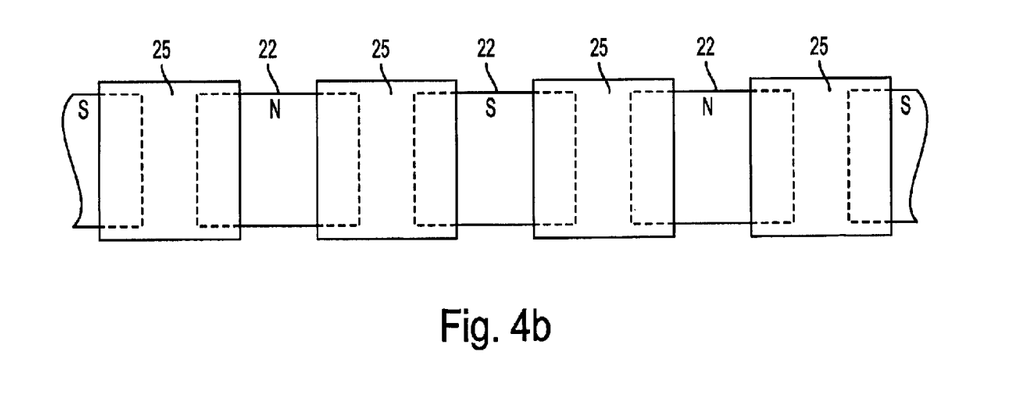
FIG. 4b is a plan view of the rotor of FIG. 4a as modified in accordance with the present invention.

FIG. 4b is a plan view of the rotor of FIG. 4a as modified in accordance with the present invention with magnetically permeable backing material 25 shown as overlaying the permanent magnets 22. The backing material has been removed at the vertical bands at the centers of the permanent magnets. As the material remains at those portions through which flux between adjacent magnets are concentrated, i.e., the vertical perimeter portions of the magnets and the spaces between magnets, the benefits of enhanced flux distribution are retained. The removal of the material at the central magnet portions has no significant bearing on flux distribution concentration but provides substantial reduction in the weight of the rotor as compared to the structure of FIG. 4a. As the volume of the backing material has been reduced, less heat generated during motor operation will be retained by the backing material. In addition, the spaces formed by removing the material may provide cooling channels or structural support opportunities.

Figure 5A:
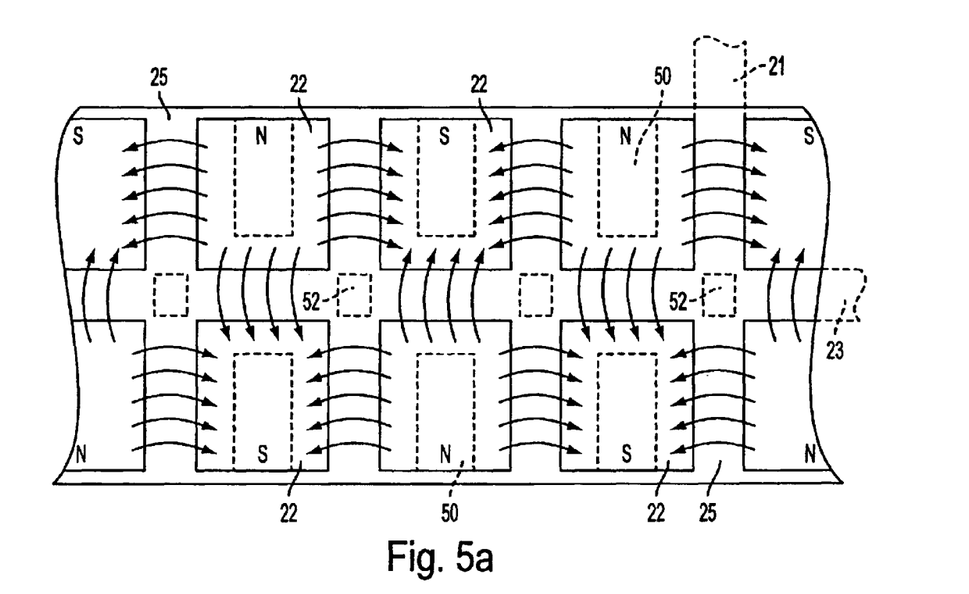
FIG. 5a is a plan view of a rotor permanent magnet ring having multiple sets of circumferentially aligned magnets backed by a continuous magnetically permeable material that depicts lines of flux created by adjacent magnets.

FIG. 5a is a plan view of a rotor permanent magnet ring having multiple sets of circumferentially aligned magnets. Permanent magnets 22 of alternating north (N) and south (S) polarities are aligned in each circumferential set on the magnetically permeable backing material 25 and separated from each other by rows of spaces 21 aligned in the axial direction. Axially aligned magnets of adjacent sets are of alternate magnetic polarities. The sets of magnets are separated from each other by column space 23, which is perpendicular to the axis. While two sets are illustrated, it is to be understood that a greater number of axially spaced sets of magnets may be utilized for interaction with a like number of stator poles of a particular axially aligned stator core configuration. A rotor magnet array thus can be formed having a plurality of intersecting row and column spaces.

Lines of flux, created by the interactive attractive forces of magnetic fields between adjacent magnets of opposite magnetic polarities, are shown as conventionally emanating from the N poles and directed to the S poles. Adjacent sets of rotor magnets are axially spaced sufficiently close to each other to generate functional magnetic fields between magnets of adjacent sets, as well as between adjacent magnets within each set. Thus lines of flux are formed in both horizontal and vertical directions between magnets. The magnetic material permits the lines of flux to be concentrated between the perimeter regions of adjacent magnets in both the horizontal and vertical directions. As shown, the lines of flux have minimal or no impact on the permeable backing material at the center portions 50 of the magnets and at intersection portions 52 of row and column spaces between magnets. As these portions of the backing material do not significantly contribute to the flux concentration functionality, the material can be removed at these locations to form apertures 51 as shown in FIG. 5b.

Figure 6A:
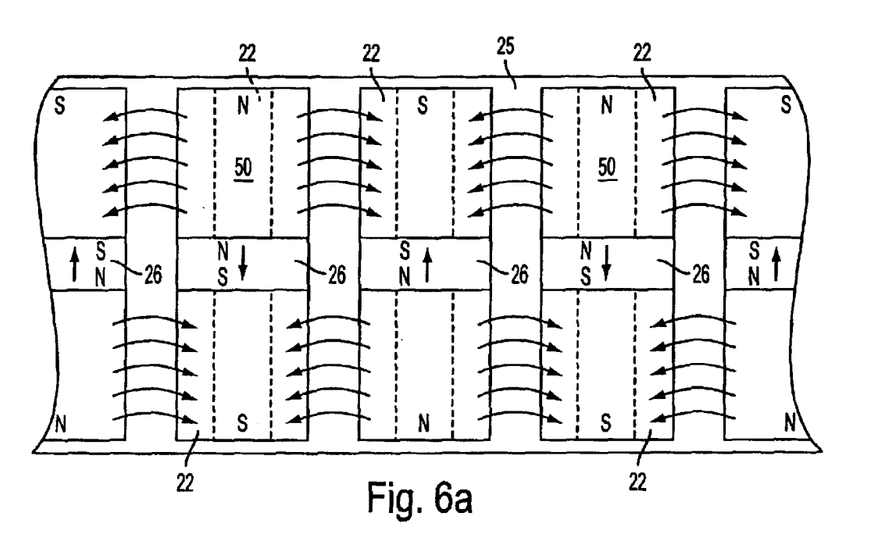

FIG. 6a is a plan view of a rotor permanent magnet ring having multiple sets of circumferentially aligned magnets similar to the arrangement of FIG. 5a. Axially magnetized permanent magnets 26 are located between the axially aligned magnets 22 of adjacent sets of magnet rings. Magnets 26 serve to channel flux between adjacent axially aligned magnets 22. Thus lines of flux are formed in backing material 25 substantially in only the horizontal directions between magnets of each axially spaced set of magnets, similar to the flux pattern depicted in FIG. 4a.

Figure 6B:
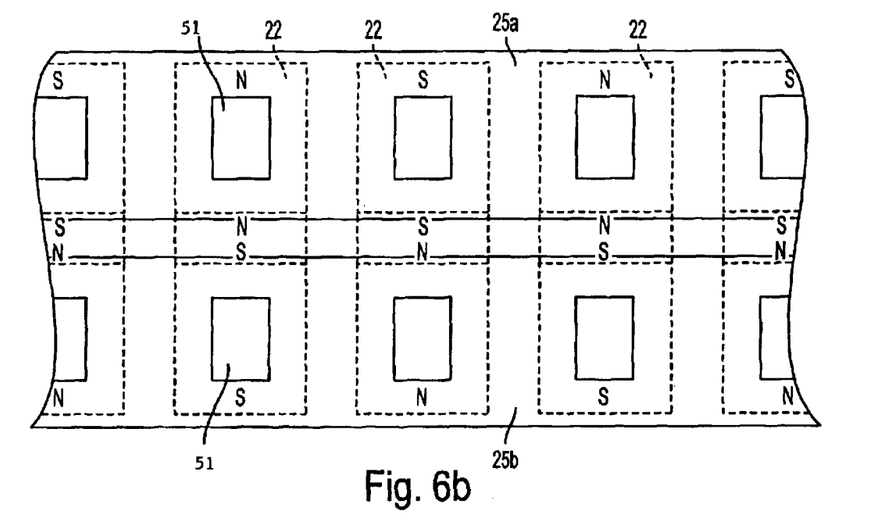
FIG. 6b is a plan view of the rotor of FIG. 6a as modified in accordance with the present invention.

FIG. 6b illustrates the rotor structure of FIG. 6a, as modified to remove portions of the backing material that do not significantly contribute to the flux concentration functionality. As there are substantially no lines of flux between the axially spaced rotor ring sections in the magnetic material in FIG. 6a due to the effect of the magnets 26, the magnetic backing material 25 of FIG. 6a has been replaced by two separated segments, 25a and 25b. Each segment contains an aperture 50 at the central portion of each permanent magnet 22. Thus, a substantial portion of the magnetic material has been removed from the structure of FIG. 6a. Additional modification of each of the segments 25a and 25b can be made without significant detriment by removing material at the vertical bands at the centers of the permanent magnets to obtain two configurations such as shown in FIG. 4b.

Figure 5B:
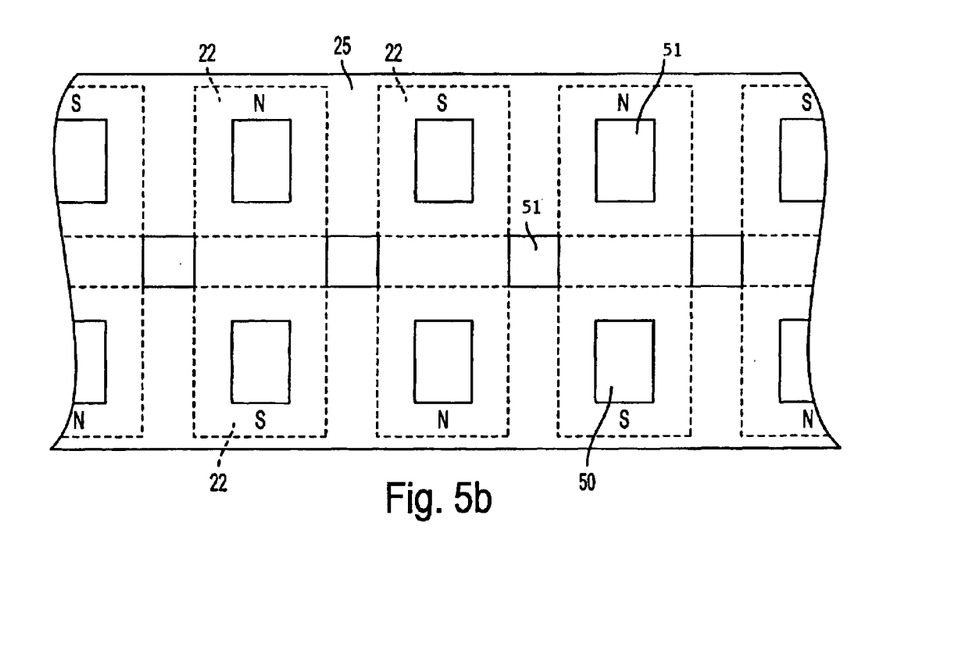
FIG. 5b is a plan view of the rotor of FIG. 5a as modified in accordance with the present invention.

The magnetically permeable backing material configurations illustrated in FIGS. 4b, 5b and 6b can be embedded to advantage in a non-magnetic back plate rotor casing. The casing can provide improved support for the magnetic material while easing assembly of elements. In addition, a greater diameter can be provided for the rotor magnet surfaces, thereby increasing motor torque capacity.

Figure 7:
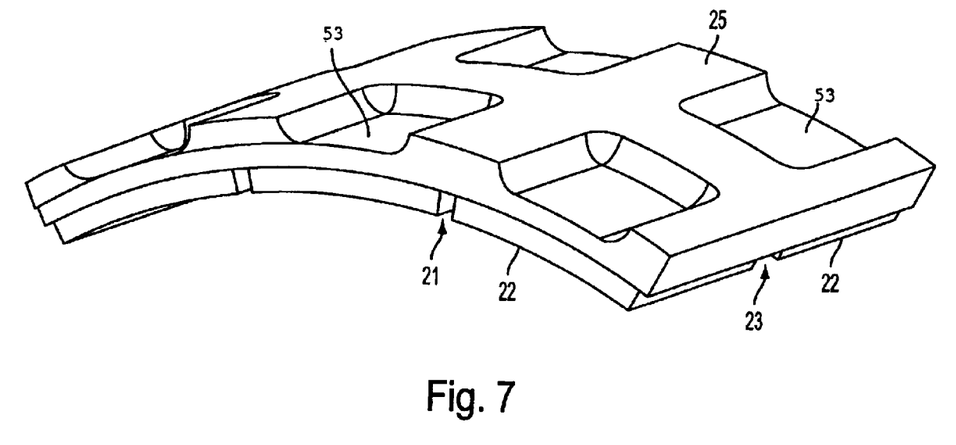
FIG. 7 is a partial three-dimensional view of a variation of the rotor configuration of FIG. 5b in accordance with the present invention.

FIG. 7 is a partial three-dimensional view of a variation of the rotor configuration of FIG. 5b in accordance with the present invention. Rotor magnets 22 are circumferentially arrayed on the magnetically permeable back plate 25 and separated by column space 23 into two sets of magnets, side by side in the axial direction. The magnets are separated circumferentially by row spaces 21 that are aligned in the axial direction. The configuration differs from the arrangement of FIG. 5b in that depressions 53 are formed in the back plate material instead of apertures. The back plate thus comprises portions that differ in radial thickness, relatively thin at those portions in contact with the center portions of the magnets while thicker at peripheral regions of the magnets and between adjacent magnets. The depressions extend to the outer edges of the rotor ring as there is no significant flux formed in these areas in the absence of adjacent magnets. This formation provides a significant savings in weight in comparison with a continuous back plate of uniform radial thickness, while providing maximum permeable material to aid flux concentration where needed in the higher flux density regions.

Figure 8:
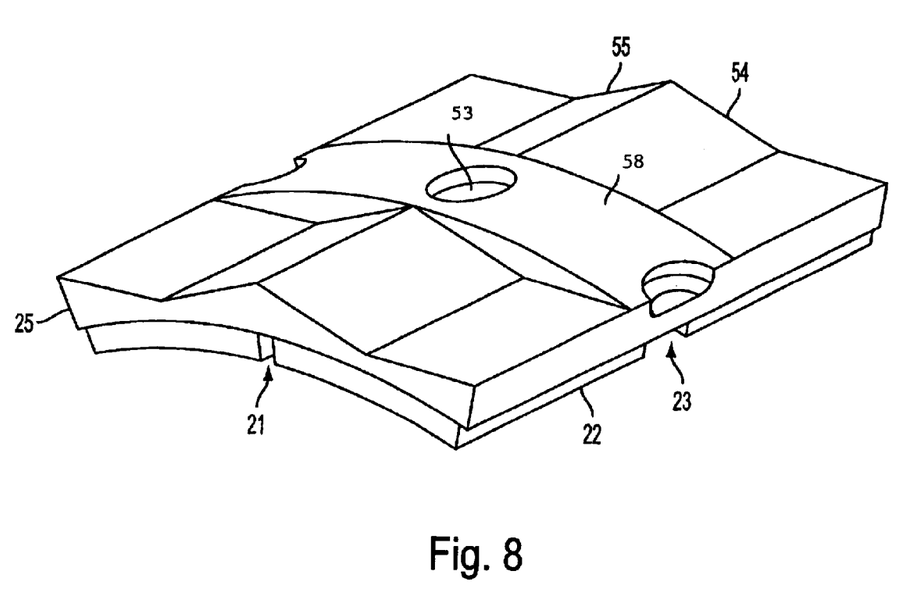
FIG. 8 is a partial three-dimensional view of another variation of a rotor configuration in accordance with the present invention.

FIG. 8 is a partial three-dimensional view of another variation of a rotor configuration in accordance with the present invention. Rotor magnets 22 are circumferentially arrayed on the magnetically permeable back plate 25 and separated by column space 23 into two sets of magnets, side by side in the axial direction. The magnets are separated circumferentially by row spaces 21 that are aligned in the axial direction. The back plate material is of varying radial thickness, whereby flux density distribution is more finely adjusted. Depressions 53 are located at the intersections of row and column spaces between magnets. The radial thickness at depressions 53 is uniform at a minimum dimension. In the region along column space 23, which axially separates the two sets of magnets, the back plate is a ring 58 of otherwise uniform radial thickness at a maximum dimension. This region extends axially in either direction to overlap peripheral areas of the magnets. At either side of ring 58, the thickness of the back plate changes in the circumferential direction between the maximum dimension at the row spaces 21 and the minimum dimension at the center of each magnet. The thickness change is at relatively uniform positive and negative slopes at portions 54 and 55.

Figure 9:
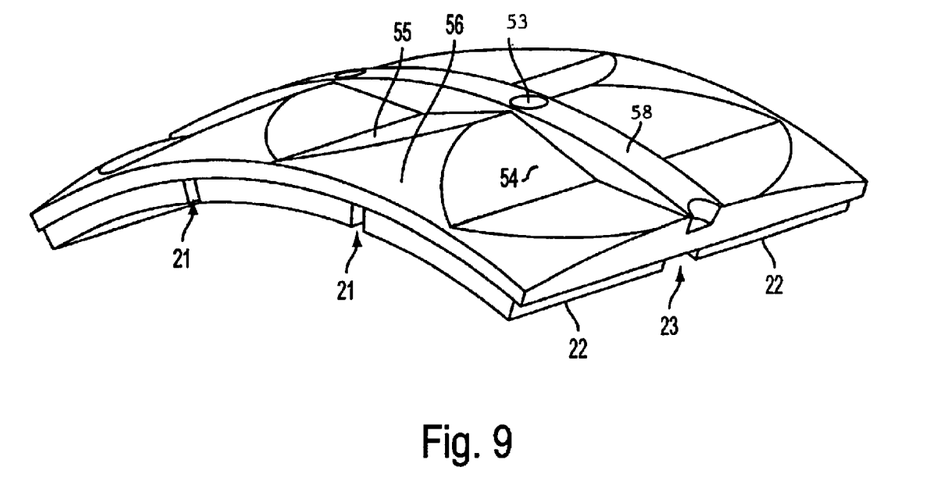
FIG. 9 is a partial three-dimensional view of a rotor configuration in accordance with the present invention that is a variation of the rotor of FIG. 8.

FIG. 9 is a partial three-dimensional view of a rotor configuration in accordance with the present invention that is a variation of the rotor of FIG. 8. The configuration illustrated in FIG. 9 differs in the variance of the thickness of the back plate at either side of ring 58. Sloped portions 54 and 55 have been modified to form curvilinear surfaces 56. The radial thickness of the back plate along each surface 56 gradually changes from the maximum dimension at approximately the central overlap of row space 21 to the minimum dimension at outer edge of the back plate.

The three dimensional views of the backplate configurations FIGS. 7 through 9 are illustrative of the inventive concept that the shape and thickness of the annular permeable material can be changed in a various ways to effect a mapping of rotor flux distribution and density as desired. The contours of the surfaces of the portions of varying thickness can be adjusted accordingly. Additional advantages are the attributes of lighter weight and better heat dissipation.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. As can be appreciated, the motor of the invention can be utilized in a wide range of applications in addition to vehicle drives. For example, in motors wherein the stators surround the rotors, the magnetically permeable backing material would be in contact with inner surfaces of the rotor magnets.

The concepts of the present invention, moreover, is not dependent upon particular stator configuration. Thus, while the preferred embodiments have been described with respect to ferromagnetically isolated electromagnet stator cores, the rotor configurations provide similar advantages if provided in motors having unitary stator cores.

What is claimed is:

1. A rotor for a rotary electric motor comprising:
   a plurality of permanent magnets circumferentially distributed about an axis of rotation, adjacent magnets successively alternating in magnetic polarity; and
   a magnetically permeable material having a surface in contact with surfaces of the plurality of permanent magnets to enhance flux distribution among the magnets, the magnetically permeable material having apertures at areas of low flux density, wherein:

the plurality of permanent magnets are arrayed in an annular ring having radially inner and outer circumferential surfaces;

the magnetically permeable material is in contact with only one of said inner and outer circumferential surfaces of the annular ring; and the magnetically permeable material comprises segments detached from each other along the circumferential direction, said apertures comprising axially aligned spaces between segments, the apertures coinciding with central portions of the magnets.

2. A rotor as recited in claim 1, wherein the magnetically permeable material is in contact with the outer circumferential surface of the annular ring.

3. A rotor for a rotary electric motor comprising:

a plurality of permanent magnets circumferentially distributed about an axis of rotation, adjacent magnets successively alternating in magnetic polarity; and a magnetically permeable material having a surface in contact with surfaces of the plurality of permanent magnets to enhance flux distribution among the magnets, the magnetically permeable material having apertures at areas of low flux density, wherein:

the plurality of permanent magnets are arrayed in an annular ring having radially inner and outer circumferential surfaces, the array comprising a plurality of axially separated sections; and each magnet exhibits one magnetic polarity at the inner surface and an opposite magnetic polarity at the outer surface to form a polar orientation in the radial direction.

4. A rotor as recited in claim 3, wherein the magnets in each section are substantially equally spaced from each other in the circumferential direction and in substantially axial alignment with the magnets of the other sections, thereby forming in the magnet array at least one column space perpendicular to the axis and a plurality of row spaces aligned in the axial direction.

5. A rotor as recited in claim 4, wherein said apertures comprise openings coincident with central portions of the magnets and the magnetically permeable material is in contact with perimeter regions of the magnets.

6. A rotor as recited in claim 5, wherein the magnetically permeable material comprises additional apertures at column space and row space intersections.

7. A rotor as recited in claim 5, further comprising auxiliary magnets positioned between adjacent sections of said axially separated sections of permanent magnets, the auxiliary magnets having polar orientations in the axial direction; and wherein the magnetically permeable material contains spaces overlapping the auxiliary magnets.

8. A rotor as recited in claim 5, wherein the magnetically permeable material is generally annular and has an opposite surface disposed at a substantially uniform radial distance from the axis.

9. A rotor as recited in claim 4, wherein the magnetically permeable material is in contact with the outer circumferential surface of the annular ring.

10. A rotor as recited in claim 5, wherein said magnetically permeable material is embedded in a non-magnetic back plate.

11. A rotor as recited in claim 1, wherein said apertures provide cooling channels for the rotor.

12. A rotary electric motor comprising:

a rotor comprising a plurality of permanent magnet elements disposed in an annular ring configuration about an axis of rotation, the magnet elements successively alternating in magnetic polarity along an annular surface, and a magnetically permeable material having a surface in contact with surfaces of the plurality of permanent magnets to enhance flux distribution among the magnets, the magnetically permeable material having apertures at areas of low flux density; and a stator spaced from the rotor by a radial air gap, the stator including a plurality of ferromagnetic core segments having respective coils wound thereon to form stator windings, the core segments separated from direct contact with each other and disposed along the radial air gap, each stator segment comprising a plurality of poles aligned with each other in a direction parallel to the axis of rotation, the stator thereby comprising a first set of stator poles in radial alignment and an axially displaced second set of stator poles in radial alignment;

wherein said apertures comprise openings coincident with central portions of the magnets, the magnetically permeable material surrounding the apertures with a surface contacting the perimeters of the magnets; and wherein the magnetically permeable material comprises additional apertures at intersections of spaces between the magnets.

13. A rotary electric motor comprising:

a rotor comprising a plurality of permanent magnet elements disposed in an annular ring configuration about an axis of rotation, the magnet elements successively alternating in magnetic polarity along an annular surface, and a magnetically permeable material having a surface in contact with surfaces of the plurality of permanent magnets to enhance flux distribution among the magnets, the magnetically permeable material having apertures at areas of low flux density; and a stator spaced from the rotor by a radial air gap, the stator including a plurality of ferromagnetic core segments having respective coils wound thereon to form stator windings, the core segments separated from direct contact with each other and disposed along the radial air gap, each stator segment comprising a plurality of poles aligned with each other in a direction parallel to the axis of rotation, the stator thereby comprising a first set of stator poles in radial alignment and an axially displaced second set of stator poles in radial alignment;

wherein said apertures comprise openings coincident with central portions of the magnets, the magnetically permeable material surrounding the apertures with a surface contacting the perimeters of the magnets; and further comprising auxiliary magnets positioned between adjacent sections, the auxiliary magnets having polar orientations in the axial direction; and wherein the magnetically permeable material contains spaces overlapping the auxiliary magnets.

14. A rotor as recited in claim 12, wherein said apertures provide cooling channels for the motor.

15. A rotor for a rotary electric motor comprising:

a plurality of permanent magnets circumferentially distributed about an axis of rotation, adjacent magnets successively alternating in magnetic polarity; and a generally annular magnetically permeable material having a surface in contact with surfaces of the plurality of permanent magnets to enhance flux distribution among the magnets, the magnetically permeable material comprising portions of different radial thickness;

wherein the magnetically permeable material is of a thinner radial thickness at areas of relatively lower flux density than at areas of relatively higher flux density; and wherein the plurality of permanent magnets are arrayed in an annular ring having radially inner and outer circumferential surfaces, the array comprising a plurality of axially separated sections, the magnets in each section are substantially equally spaced from each other in the circumferential direction and in substantially axial alignment with the magnets of the other sections, thereby forming in the magnet array at least one column space perpendicular to the axis and a plurality of row spaces aligned in the axial direction; and the areas of thinner radial thickness of the magnetically permeable material are coincident with central portions of the magnets.

16. A rotor as recited in claim 15, wherein the magnetically permeable material comprises additional areas of thinner radial thickness at column space and row space intersections.

17. A rotor as recited in claim 15, wherein the radial thickness of the magnetically permeable material is tapered in accordance with the flux density distribution pattern in the rotor.

18. A rotor as recited in claim 15, wherein the areas of thinner radial thickness of the magnetically permeable material are of relatively uniform thickness.

19. A rotor as recited in claim 15, wherein the areas of thinner radial thickness of the magnetically permeable material are of variable thickness.

* * * * *